United States Patent
Hart et al.

[11] 3,785,161
[45] Jan. 15, 1974

[54] SEPARATION OF COMPONENTS OF VAPOROUS FLUIDS

[75] Inventors: Walter C. Hart, Bartlesville; Suman P. N. Singh, Stillwater, both of Okla.

[73] Assignee: Phillips Petroleum Company, Bartlesville, Okla.

[22] Filed: Mar. 30, 1970

[21] Appl. No.: 23,940

[52] U.S. Cl. ................. 62/23, 62/38, 62/26
[51] Int. Cl. ................................ F25j 3/06
[58] Field of Search .......... 62/23, 24, 26, 27, 62/28, 30, 38, 39, 41

[56] References Cited
UNITED STATES PATENTS

| | | | |
|---|---|---|---|
| 2,134,700 | 11/1938 | Brewster | 62/39 |
| 2,134,702 | 11/1938 | Brewster | 62/39 |
| 2,502,250 | 3/1950 | Dennis | 62/39 |
| 2,666,019 | 1/1954 | Winn | 62/39 |
| 2,970,451 | 2/1961 | Ehrlich | 62/23 |
| 3,119,677 | 1/1964 | Moon | 62/28 |
| 3,261,168 | 7/1966 | Ruhemann | 62/38 |
| 3,433,026 | 3/1969 | Swearingen | 62/39 |
| 2,503,939 | 4/1950 | DeBaufre | 62/38 |
| 2,530,602 | 11/1950 | Dennis | 62/41 |
| 2,713,781 | 7/1955 | Williams | 62/39 |
| 3,205,669 | 9/1965 | Grossman | 62/38 |

*Primary Examiner*—Norman Yudkoff
*Attorney*—Young & Quigg

[57] ABSTRACT

High molecular weight components are separated from lower molecular weight components of a vaporous fluid stream. A first vaporous fluid feedstock is expanded. A second vaporous fluid feedstock is compressed. Said expanded and compressed streams are then passed in indirect heat exchange relationship to cool said compressed stream. The cooled compressed stream is then passed to a separation zone to separate the more volatile lower molecular weight components from the less volatile higher molecular weight components.

9 Claims, 2 Drawing Figures

SEPARATION OF COMPONENTS OF VAPOROUS FLUIDS

This invention relates to the separation of higher molecular weight components from lower molecular weight components of a vaporous fluid stream.

It is known in the prior art that higher molecular weight components can be separated from lower molecular weight components of a vaporous fluid feed stream by subjecting the feed stream to cryogenic temperatures using various refrigerants (such as propane, ethylene, nitrogen, etc.). In these processes, the feedstock is brought to a sufficiently low temperature under pressure thereby liquefying the entire volume of the vaporous fluid feed. Subsequently, the lower molecular weight components can be flashed from this liquefied mixture.

The above-mentioned and other prior art methods of separating valuable higher molecular weight components from a vaporous fluid feed stream have several disadvantages. For example, the well known cascade-type refrigeration systems require a heavy outlay of equipment which leads to high initial plant investment and high operating costs. Additionally, the cascade-type system requires facilities to purify, replenish, and store the refrigerants such as propane.

Therefore, there has been a need in the art for an efficient process for the separation of the higher molecular weight components from lower molecular weight components of a vaporous fluid feed stream employing a minimum amount of equipment. In particular, a process has been needed wherein ethane and other heavier components can be separated from natural gas. This need is aggravated by the fact that the separation of the ethane and other heavy components from the natural gas must sometimes be performed in areas which are relatively remote with regard to availability of power supply and other natural resources. The utilization of the ethane and heavier components as petrochemical feedstocks has created a need for new systems of low initial plant investment which can effect the separation of these valuable compounds at economical operating costs. Moreover, it is sometimes desirable to have a system which does not use a large volume of an external refrigerant, such as propane, etc., because this eliminates the high cost of handling these refrigerants.

The present invention provides a solution to the above problems. We have now discovered that higher molecular weight components can be economically separated from lower molecular weight components of a vaporous fluid feed stream by a process wherein a first vaporous fluid feed stream is expanded, a second vaporous fluid feed stream is compressed, said expanded and compressed streams are then passed in indirect heat exchange relationship to cool the compressed stream. The cooled stream is then passed to a separation zone to separate the more volatile low molecular weight components from the less volatile higher molecular weight components.

Thus, an object of this invention is to provide a method for the separation of higher molecular weight components from lower molecular weight components contained in vaporous fluids. Another object of this invention is to provide a method for separating ethane and higher molecular weight components of a natural gas stream from methane and other components more volatile than said ethane, with a minimum amount of equipment, plant investment, and operating costs. Other aspects, objects, and advantages of the invention will be apparent to those skilled in the art in view of this disclosure.

Thus, according to the invention, there is provided a process for cryogenically separating higher molecular weight components of a vaporous fluid feed stream from lower molecular weight components of said feed stream, which process comprises: (a) expanding a first vaporous fluid feed stream and decreasing the temperature and pressure thereof; (b) compressing a second vaporous fluid feed stream containing said higher and said lower molecular weight components and increasing the temperature and pressure thereof; (c) passing said compressed second feed stream in indirect heat exchange relationship with said expanded first feed stream; (d) passing said second feed stream from said heat exchange to a first separation zone; (e) withdrawing an essentially vaporous stream comprising said lower molecular weight components from said first separation zone as a product of the process; and (f) withdrawing an essentially liquid stream comprising said higher molecular weight components from said first separation zone.

A number of advantages are obtained or realized in the practice of the invention. The process of the invention provides an economical method for separating higher molecular weight components from lower molecular weight components of a vaporous fluid utilizing the minimum amount of conventional equipment, plant investment, and lower operating costs. In a preferred embodiment the energy contained in a relatively high pressure feed stream, which is preferably lean in the higher molecular weight components, is utilized to compress a relatively low pressure feed stream which is preferably rich in said higher molecular weight components. In the practice of the invention, the valuable higher molecular weight components are recovered in liquid form which is convenient for storage and subsequent use in the manufacture of petrochemicals. The stream of lower molecular weight components which is recovered in the practice of the invention is more suited for its most practical use, e.g., a high B.t.u./cu. ft. fuel gas, and thus its value is also increased.

Figure 1:
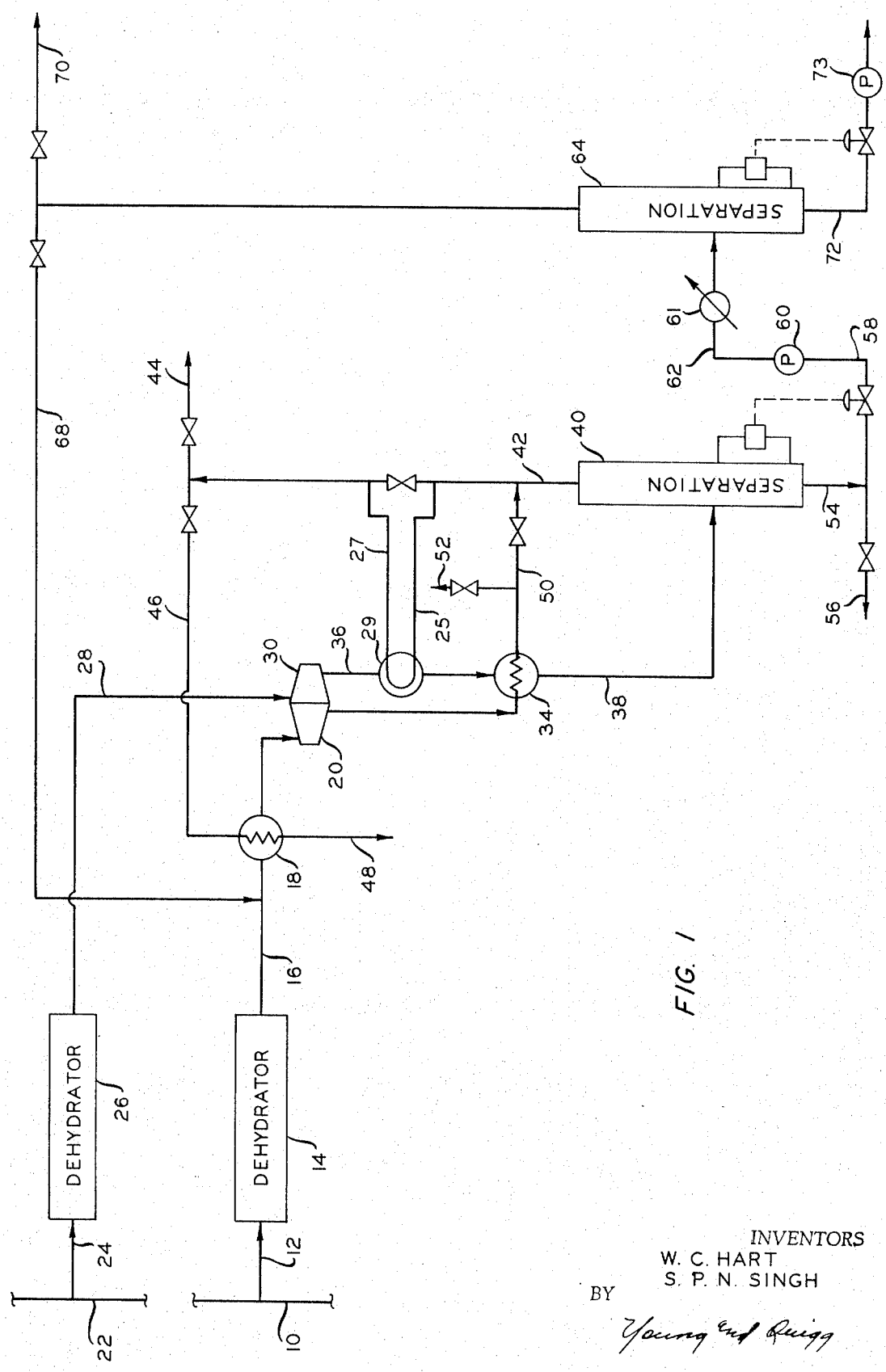
FIG. 1 is a diagrammatic flow sheet illustrating one embodiment of the invention.

Referring now to the drawings, wherein like reference numerals have been employed to denote like elements, the invention will be more fully explained. It will be understood that many valves, pumps, control instruments, and other conventional equipment not necessary for explaining the invention have been omitted for the sake of brevity. For convenience, and not by way of limitation, the invention is illustrated with reference to the separation of ethane and higher molecular weight components from methane and other components more volatile than said ethane contained in a vaporous fluid feed stream comprising natural gas. The ethane and heavier components of natural gas are oftentimes referred to as natural gas liquids. These "liquids" include hydrocarbons such as ethane, propane, butanes, pentanes, and some higher molecular weight components, which are valuable as raw materials for preparing various petrochemicals. The "more volatile" components referred to above include such materials as hydrogen, nitrogen, helium, carbon dioxide, and the like. As used herein and in the claims, unless otherwise specified, the term "lower molecular weight components" will be understood to include such materials as said more volatile components mentioned above. It should also be understood that it is within the scope of the invention to separate other fractions of natural gas using the methods of the invention, for example, such as separating ethane and lighter components from propane and heavier components, or separating propane and lighter components from butane and heavier components, etc.

It should also be understood that the representative temperatures and pressures set forth hereinafter in the description of the drawings are only illustrations of temperatures and pressures which can be utilized. The particular temperatures and pressures utilized in any particular separation will be dependent upon the nature and composition of the vaporous fluid feed stream, upon the particular heat exchange surface area available, and upon the initial temperature and pressure of the vaporous fluid feed streams.

As illustrated in FIG. 1, a stream of natural gas is withdrawn from conduit 10 and passed via conduit 12 into dehydrator 14. Said conduit 10 can be a pipe line or a conduit from a well head. The natural gas in conduit 12 can be at a temperature of about 90° F. and is preferably under a relatively high pressure of about 605 psia. Said dehydrator 14 can comprise any suitable means for the dehydration of a natural gas. Such dehydration means and processes are well known in the art and need not be described in detail herein. If dehydration of the gas is not necessary, dehydrator 14 can be bypassed by means not shown. The natural gas is passed from dehydrator 14 via conduit 16, through heat exchanger 18, and introduced at a temperature of about −14° F. and a pressure of about 600 psia into the expander section 20 of an expander-compressor unit.

A second stream of natural gas is withdrawn from conduit 22 via conduit 24 and passed, if necessary or desirable, through dehydrator 26. Conduit 22 can be a pipe line a conduit from a well head. The natural gas in conduit 24 can be at a temperature of about 90° F. and is preferably under a relatively low pressure of about 100 psia. Preferably, said second stream of natural gas will be rich in higher molecular weight components such as ethane and heavier materials. The natural gas from dehydrator 26 is passed via conduit 28 into the compressor section 30 of said expander-compressor unit.

Said first stream of natural gas is expanded in expander section 20 whereby the temperature and pressure thereof are decreased. The energy released upon said expansion is utilized to drive compressor section 30. Said second stream of natural gas is compressed in compressor section 30 whereby the temperature and pressure thereof are increased. The effluent from said compressor section 30 is passed through heat exchanger 29 for cooling. The expanded first natural gas stream is withdrawn from expander section 20 via conduit 32 at a temperature of about −124° F. and a pressure of about 150 psia, and passed in heat exchange relationship in heat exchanger 34 with the compressed second stream of natural gas withdrawn from compressor section 30 via conduit 36. The compressed and now cooled second stream of natural gas is passed from heat exchanger 34 via conduit 38 at a temperature of about −102° F. and a pressure of about 135 psia into first separation zone 40. Said separation zone 40 can comprise any suitable separation means such as a liquid-vapor separator tower. An essentially vaporous stream comprising said lower molecular weight components, and containing only small amounts of ethane and heavier components, is withdrawn from said first separation zone 40 via conduit 42 at a temperature of about −102° F. and a pressure of about 135 psia as a product of the process. Preferably, at least a portion of the stream in conduit 42 is through heat exchanger 29 via conduits 25 and 27. Said product can be passed to storage or other use via conduit 44 or can be passed via conduit 46 into indirect heat exchange relationship with said first stream of natural gas in heat exchanger 18 and then passed via conduit 48 to storage or other use. The expanded first stream of natural gas can be passed from heat exchanger 34 via conduit 50 into conduit 42 to be combined with the stream therein as a part of said product. If desired, said expanded first stream of natural gas can be withdrawn via conduit 52.

An essentially liquid stream comprising said higher molecular weight components, and containing only small amounts of methane and other components more volatile than ethane, is withdrawn from first separation zone 40 via conduit 54 at a temperature of −102° F. and a pressure of 135 psia, and if desired can be passed via conduit 56 to storage or other use. Preferably, said stream in conduit 54 is passed via conduit 58, controlled by the flow control valve and liquid level control means shown, through pump 60 wherein the pressure thereon is increased to about 615 psia, through heater 61, and is then introduced via conduit 62 into second liquid-vapor separation zone 64. An essentially vaporous stream comprising lower molecular weight components is withdrawn from 64 via conduit 66 at a temperature of −30° F. and a pressure of 610 psia and is preferably passed via conduit 68 into conduit 16 for combining with said first stream of natural gas. If desired, the lower molecular weight components in conduit 66 can be passed via conduit 70 to other use. An essentially liquid stream comprising higher molecular weight components is withdrawn from second separation zone 64 via conduit 72 at a temperature of −30° F. and a pressure of 610 psia, controlled by the flow control valve and liquid level control means shown, and passed to storage or other use.

Figure 2:
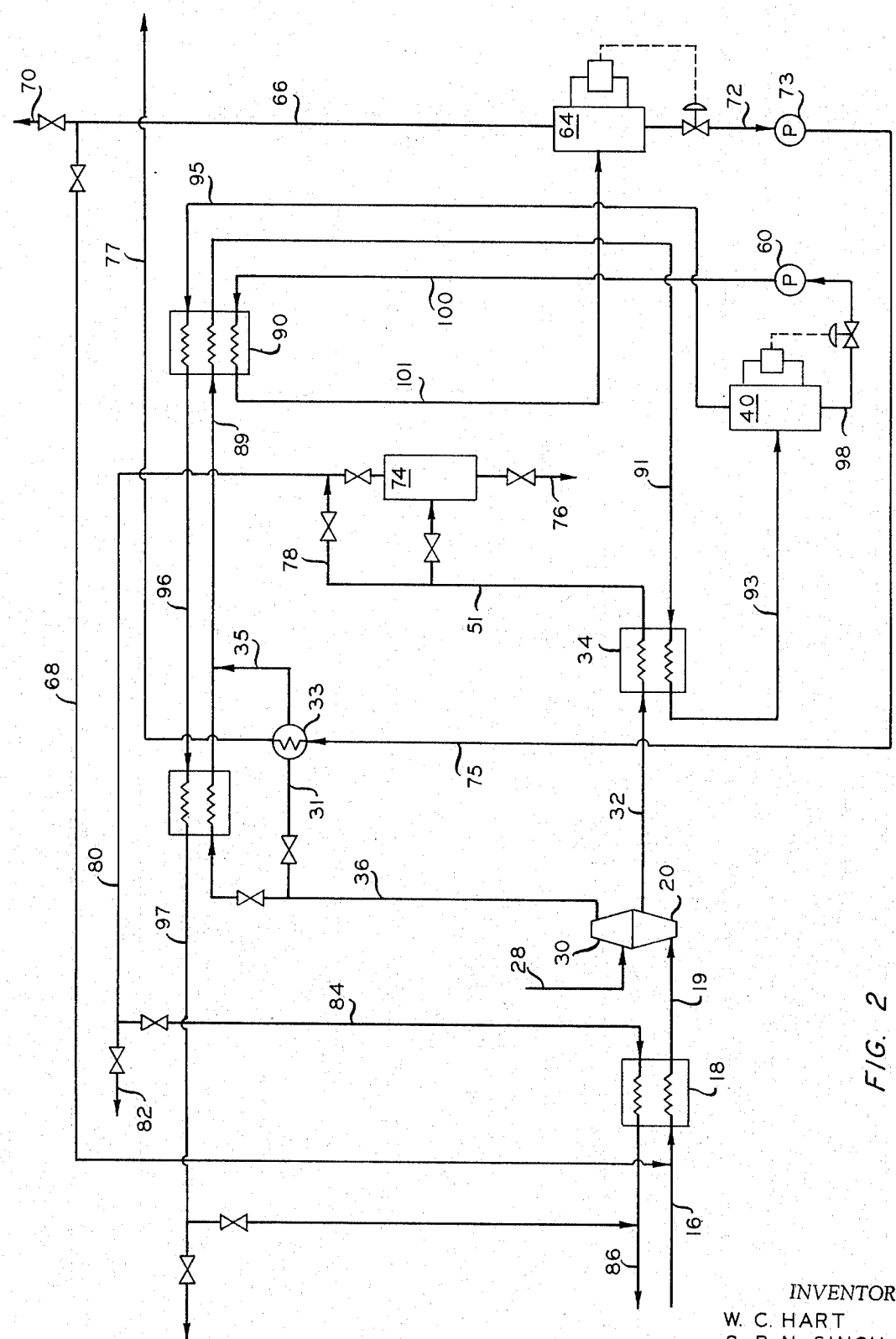
FIG. 2 is a diagrammatic flow sheet illustrating another presently more preferred embodiment of the invention.

FIG. 2 illustrates one presently preferred embodiment of the invention. A first feed stream of relatively high pressure natural gas, preferably lean in said high molecular weight components, at a temperature of about 90° F. and preferably under a relatively high pressure of about 605 psia, is passed via conduit 16 through heat exchanger 18, exits therefrom at a temperature of about −14° F. and a pressure of about 600 psia, and is passed via conduit 19 into expander section 20 of an expander-compressor unit. The expanded gas is withdrawn via conduit 32 at a temperature of about −124° F. and a pressure of about 150 psia and passed through heat exchanger 34, exiting therefrom at a temperature of about −40° F. and a pressure of about 140 psia. The gas stream from heat exchanger 34 is passed via conduit 51 into trap or knockout drum 74 for the removal of any higher molecular weight components which may have been condensed by the described expansion and cooling steps. Said higher molecular weight components can be withdrawn via conduit 76.

If desired, said stream in conduit 76 can be introduced into conduit 93 for introduction into first separation zone 40. Said trap or knockout drum 74 may not be necessary or desirable. If so, the stream of gas in conduit 52 can bypass trap 74 via conduit 78 and be introduced into conduit 80 for removal from the system. Since the gas feed stream in conduit 16 is preferably lean in higher molecular weight components, the stream in conduit 80 will be comprised predominantly of lower molecular weight components. Said stream can be removed via conduit 82 for utilization as fuel gas or other use. Preferably, however, the stream of gas in conduit 80 is passed via conduit 84 into said heat exchanger 18 for indirect heat exchange with the incoming stream of gas in conduit 16. Typically, said stream of gas from conduit 84 will exit from heat exchanger 18 via conduit 86 at a temperature of about 60° F. and a pressure of about 130 psia.

A second feed stream of natural gas containing higher molecular weight components and lower molecular weight components, and preferably rich in said higher molecular weight components, is introduced via conduit 28 at a temperature of about 90° F. and a pressure of about 100 psia into the compressor section 30 of said expander-compressor unit. Said expander-compressor unit is a conventional piece of equipment with the compressor section being driven by the expander or turbine section and thus utilizing the energy contained in the stream of high pressure gas introduced into the expander section 20 via conduit 19. The compressed and heated gas from expander section 30 is withdrawn via conduit 36, passed through heat exchanger 88 from which it exits at a temperature of about 20° F. and a pressure of about 140 psia, then passed via conduit 89 into heat exchanger 90 from which it exits via conduit 91 at a temperature of about −33° F. and a pressure of about 138 psia, then passed through heat exchanger 92 from which it exits via conduit 93 at a temperature of about −102° F., and is then introduced into first separation 40. Said separation zone 40 can comprise any suitable separation means such as a liquid-vapor separator vessel. Preferably, a portion, approximately 50 per cent, of the stream in conduit 36 is passed via conduit 31 into heat exchanger 33 and then passed via conduit 35 into conduit 89 for recombining with the portion of said stream which was passed through heat exchanger 88.

The separation in separation zone 40 favors the retention of ethane and higher molecular weight components in the bottoms product described hereinafter. An essentially vaporous stream comprising lower molecular weight components such as methane and other components more volatile than ethane, but usually containing a small amount of ethane, is withdrawn from separation zone 40 via conduit 95 at a temperature of about −102° F. and a pressure of about 135 psia, passed through said heat exchanger 90 from which it exits at a temperature of about −30° F. and a pressure of about 130 psia, then passed via conduit 96 into said heat exchanger 88 from which it exits via conduit 97 at a temperature of about 83° F. and a pressure of about 125 psia. If desired, said stream of gas in conduit 97 can be combined with the stream of gas in conduit 86.

An essentially liquid stream comprising higher molecular weight components such as ethane and heavier hydrocarbons is withdrawn from separation zone 40 via conduit 98, passed through pump 60 from which it exits at a temperature of about −102° F. and a pressure of about 615 psia, then passed via conduit 100 into said heat exchanger 90 from which it exits via conduit 101 at a temperature of about −30° F. and is then introduced into second separation zone 64.

Said second separation zone can comprise any suitable separation means such as a liquid-vapor separator vessel. The separation in separation zone 64 favors the retention of ethane and higher molecular weight components in the bottoms product therefrom. An essentially vaporous stream comprising lower molecular weight components is withdrawn from said second separation zone 64 via conduit 66 at a temperature of about −30° F. and a pressure of about 610 psia. Said stream of gas in conduit 66 can be withdrawn from the system via conduit 70 for use as fuel gas or other use if desired. Preferably, said stream of gas in conduit 66 is passed via conduit 68 into said conduit 16 for combining with the incoming stream of gas therein and recycle through the system.

An essentially liquid stream comprising higher molecular weight components is withdrawn from separation zone 64 via conduit 72 by means of pump 73 and introduced into conduit 75 at a pressure, e.g., about 1,505 psia, and a temperature of about −30° F. Said stream in conduit 75 is then passed through said heat exchanger 33 from which it exits via conduit 77 at a temperature of about 83° F. and a pressure, e.g., about 1,500 psia. Said stream in conduit 77 comprises the natural gas liquids product of the process.

The individual elements of apparatus employed in the systems illustrated in FIGS. 1 and 2 are conventional apparatus. For example, said heat exchangers can be any suitable type of heat exchanger. Preferably, said exchangers 18, 34, 88, and 90 are plate-type exchangers.

The following illustrative example will serve to further illustrate the invention.

EXAMPLE

In this illustrative example a first stream of natural gas under a relatively high pressure of about 605 psia, and lean in higher molecular weight components, is introduced via conduit 16 and utilized essentially as described above in connection with FIG. 2. A second stream of natural gas under a relatively low pressure of about 100 psia, and rich in higher molecular weight components, is introduced into the system via conduit 28 and processed essentially as described above in connection with FIG. 2. The material balance set forth in Table I below shows the composition of the principal streams in a system operated essentially in accordance with FIG. 2 as described above.

TABLE I

| Stream number | 16 | 28 | 97 | 68 | 86 | 77 |
|---|---|---|---|---|---|---|
| Components, mol. percent: | | | | | | |
| $CO_2$ | | .56 | 0.72 | | | |
| $N_2$ | 1.88 | 1.42 | 1.76 | 1.04 | 1.80 | 0.06 |
| $C_1$ | 91.05 | 80.63 | 91.40 | 86.47 | 91.11 | 17.90 |
| $C_2$ | 6.34 | 9.43 | 5.71 | 10.13 | 6.37 | 28.63 |
| $C_3$ | 0.70 | 4.93 | 0.41 | 2.13 | 0.69 | 31.69 |
| $iC_4$ | 0.02 | 0.51 | | 0.23 | 0.03 | 3.63 |
| $nC_4$ | | 1.37 | | | | 9.79 |
| $iC_5$ | | 0.32 | | | | 2.30 |
| $nC_5$ | 0.01 | 0.36 | | | | 2.60 |
| $C_6^+$ | | 0.47 | | | | 3.40 |
| Total | 100.00 | 100.00 | 100.00 | 100.00 | 100.00 | 100.00 |
| Rate: | | | | | | |
| MMCFD [a] | 20.0 | 13.1 | 9.5 | 1.8 | 31.3 | |
| GPD [b] | | | | | | 47,760 |

[a] Million ft.³ per day.
[b] Gallons per day.

The above example illustrates that the processes of the invention can be utilized to efficiently separate higher molecular weight components from lower molecular weight components of a vaporous fluid feed stream.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A process for cryogenically separating ethane and higher molecular weight components of a vaporous fluid feed natural gas stream from methane and components of lower molecular weight and more volatile than ethane in said feed stream, which process comprises:
   a. expanding a first vaporous fluid feed natural gas stream lean in ethane and said higher molecular weight components and decreasing the temperature and pressure thereof;
   b. compressing a second vaporous fluid feed natural gas stream richer in ethane and said higher molecular weight components than said first feed stream and which stream also contains methane and said lower molecular weight components and increasing the temperature and pressure thereof;
   c. passing said compressed second feed stream in indirect heat exchange relationship with said expanded first feed stream;
   d. passing said second feed stream from said heat exchange to a first separation zone;
   e. withdrawing an essentially vaporous stream comprising methane and said lower molecular weight components from said first separation zone and combining therewith said expanded first feed stream obtained in step (c) as a product of the process;
   f. withdrawing an essentially liquid stream comprising ethane and said higher molecular weight components from said first separation zone
   g. increasing the pressure of and heating said essentially liquid stream from step (f) and passing same to a second separation zone;
   h. withdrawing an essentially vaporous stream comprising said lower molecular weight components from said second separation zone and combining same with said first feed stream prior to said expansion in step (a); and
   i. withdrawing an essentially liquid stream comprising said higher molecular weight components from said second separation zone as another product of the process.

2. A process according to claim 1 wherein: said second feed stream is compressed in the compressor section of a compressor-expander; said first feed stream is expanded in said expander section; and said expander section drives said compressor section.

3. A process according to claim 1 wherein: prior to said step (c), said compressed second feed stream is passed in heat exchange relation with said product stream from step (e).

4. A process according to claim 3 wherein: said compressed second feed stream is also passed in heat exchange relation with said essentially liquid stream from step (g) prior to said step (c).

5. A process according to claim 4 wherein: at least a portion of said compressed second feed stream is passed in heat exchange relation with said product stream from step (i) prior to said step (c) and also prior to being passed in heat exchange relation with said essentially liquid stream from step (g).

6. A process according to claim 5 wherein: after said step (c), said expanded first feed stream is passed in heat exchange relation with said first feed stream prior to the expansion thereof in said step (a).

7. A process according to claim 6 wherein: said expanded first feed stream, after being passed in said heat exchange relation, is combined with said product stream from step (e) after said product stream has been passed in heat exchange relation with said compressed second feed stream; and said vaporous stream from step (h) is combined with said first feed stream prior to the expansion thereof in step (a).

8. A process according to claim 7 wherein: said first feed stream and said second feed stream each comprises a stream of natural gas; said higher molecular weight components comprise ethane and hydrocarbons having a molecular weight greater than ethane; and said lower molecular weight components comprise methane and other components more volatile than ethane.

9. A process according to claim 4 wherein: heat exchange of said compressed second feed stream comprises at least two stages prior to said step (c), the first stage comprising indirect heat exchange between said compressed second feed stream and said product stream from step (e) to partially cool said compressed second feed stream and the second stage comprising indirect heat exchange between the two streams in the first stage plus said essentially liquid stream from step (g) to further cool said compressed second feed stream which is then passed to said step (c) for further cooling by indirect heat exchange with said expanded first feed stream.

* * * * *